United States Patent
Thürer et al.

(10) Patent No.: US 12,060,293 B2
(45) Date of Patent: Aug. 13, 2024

(54) PROCESS FOR THE PREPARATION OF SYNTHETIC QUARTZ GLASS

(71) Applicant: Heraeus Quarzglas GmbH & Co. KG, Hanau (DE)

(72) Inventors: Martin Thürer, Bitterfeld-Wolfen (DE); Walter Lehmann, Kleinostheim (DE); Martin Trommer, Bitterfelf-Wolfen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 105 days.

(21) Appl. No.: 17/553,270

(22) Filed: Dec. 16, 2021

(65) Prior Publication Data

US 2022/0185715 A1  Jun. 16, 2022

(30) Foreign Application Priority Data

Dec. 16, 2020  (EP) ..................................... 20214538

(51) Int. Cl.
 *C03B 19/14* (2006.01)
 *C03C 3/06* (2006.01)
(52) U.S. Cl.
 CPC ............ *C03B 19/1423* (2013.01); *C03C 3/06* (2013.01); *C03B 2207/36* (2013.01)
(58) Field of Classification Search
 None
 See application file for complete search history.

(56) References Cited

U.S. PATENT DOCUMENTS

| 3,957,474 | A | 5/1976 | Kobayashi et al. |
| 6,751,987 | B1 * | 6/2004 | Ball ..................... C03B 19/1423 431/129 |
| 8,820,122 | B2 | 9/2014 | Maida et al. |
| 9,056,785 | B2 | 6/2015 | Maida et al. |
| 9,061,935 | B2 | 6/2015 | Fabian |
| 9,272,942 | B2 | 3/2016 | Trommer et al. |
| 9,481,597 | B2 | 11/2016 | Badeke et al. |
| 9,701,561 | B2 | 7/2017 | Coapes et al. |
| 10,011,518 | B2 | 7/2018 | Badeke et al. |

(Continued)

FOREIGN PATENT DOCUMENTS

| CN | 102583977 | 7/2012 |
| DE | 101 02 611 | 8/2002 |

(Continued)

OTHER PUBLICATIONS

Toppr.com, Flame and Structure of a Flame, https://www.toppr.com/guides/chemistry/combustion-and-flame/, Mar. 2019.

*Primary Examiner* — Queenie S Dehghan
(74) *Attorney, Agent, or Firm* — Dicke, Billig & Czaja, PLLC

(57) ABSTRACT

Described is a method of producing synthetic fused silica in which the synthetic flame used in the method has a ratio of the Full Width at Half Maximum ($FWHM_{vert}$) vertical luminous intensity to the Full Width at Half Maximum ($FWHM_{hori}$) horizontal luminous intensity greater than 10 in a targetless state, the luminous intensities being measured in candela/$mm^2$.

7 Claims, 1 Drawing Sheet

(56) References Cited

U.S. PATENT DOCUMENTS

| | | |
|---|---|---|
| 11,155,488 B2 | 10/2021 | Noda et al. |
| 11,267,745 B2 | 3/2022 | Laudahn et al. |
| 2004/0182114 A1 | 9/2004 | Ooishi et al. |
| 2005/0223750 A1 | 10/2005 | Nutini et al. |
| 2007/0251918 A1 | 11/2007 | Bera et al. |
| 2014/0227512 A1 | 9/2014 | Smith et al. |
| 2015/0033799 A1 | 2/2015 | Ishihara et al. |
| 2019/0084866 A1 | 3/2019 | Oozeki |
| 2019/0300419 A1 | 10/2019 | Noda et al. |
| 2020/0062635 A1* | 2/2020 | Agrawal ................ F23D 14/02 |
| 2022/0185716 A1 | 6/2022 | Thuerer et al. |
| 2022/0185720 A1 | 6/2022 | Thuerer et al. |

FOREIGN PATENT DOCUMENTS

| | | |
|---|---|---|
| DE | 102 25 106 | 2/2004 |
| EP | 0163752 | 12/1985 |
| EP | 0622340 | 11/1994 |
| GB | 1061042 | 3/1967 |
| JP | S54-020024 | 2/1979 |
| JP | H06-305736 | 11/1994 |
| JP | 2005187319 | 7/2005 |
| JP | 2011-102232 | 5/2011 |
| JP | 2015-505809 | 2/2015 |
| WO | 90/10596 | 9/1990 |
| WO | 99/20574 | 4/1999 |

\* cited by examiner

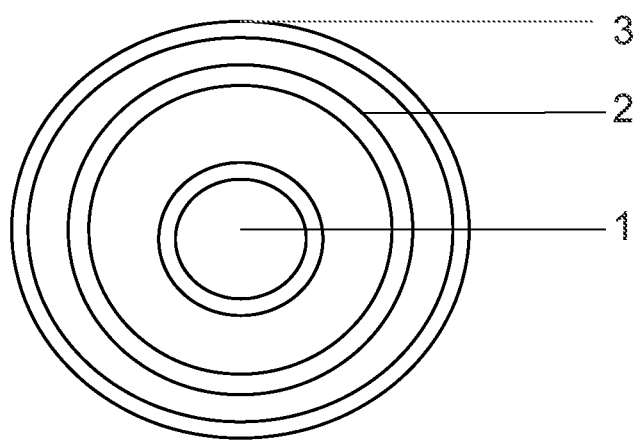

PROCESS FOR THE PREPARATION OF SYNTHETIC QUARTZ GLASS

CROSS-REFERENCE TO RELATED APPLICATIONS

This Utility Patent Application claims priority to European Application No. 20214538.9 filed on Dec. 16, 2020, which is incorporated herein by reference and is related to U.S. Ser. No. 17/553,143, filed Dec. 16, 2021 and U.S. Ser. No. 17/553,326 filed Dec. 16, 2021.

TECHNICAL FIELD

One aspect relates to a process for the production of synthetic quartz glass and to a corresponding apparatus for carrying out the process according to one embodiment.

BACKGROUND

For the production of synthetic quartz glass, $SiO_2$ particles are generated from a silicon-containing starting substance in a CVD process by hydrolysis or oxidation and deposited on a moving carrier. A distinction can be made between external and internal deposition processes. In external deposition processes, the $SiO_2$ particles are deposited on the outside of a rotating carrier. Examples of such external deposition processes are the so-called OVD process (Outside Vapour Phase Deposition), the VAD process (Vapour Phase Axial Deposition) or the PECVD process (Plasma Enhanced Chemical Vapour Deposition). The best-known example of an internal deposition process is the MCVD process (Modified Chemical Vapor Deposition), in which $SiO_2$ particles are deposited on the inner wall of a tube heated from the outside.

At a sufficiently high temperature in the area of the carrier surface, the $SiO_2$ particles vitrify directly, which is also known as "direct vitrification". In contrast, in the so-called "soot process", the temperature during deposition of the $SiO_2$ particles is so low that a porous $SiO_2$ soot layer is obtained, which is then sintered to transparent quartz glass in a separate process step. Both the direct vitrification and the soot processes result in a dense, transparent, high-purity synthetic fused silica.

In the prior art processes for the production of synthetic fused silica, a method is generally used to ensure sufficient deposition efficiency of the $SiO_2$ particles, where deposition efficiency is understood to be the quotient of the weight of the soot body produced and the mathematically maximum total amount of $SiO_2$ that can be produced, assuming complete conversion of the silicon from the silicon-containing starting compound used.

In order to provide a carbonaceous soot body that has a lower OH value (good for fiber applications) after vitrification, DE 10 2011 121 153 A proposes to feed the polysiloxane compound into the flame superstoichiometrically compared to oxygen during the deposition of the $SiO_2$ particles, i.e. to use a so-called rich flame during the deposition.

Another process for the production of synthetic quartz glass is disclosed in DE 101 02 611 A, in which it is described that inhomogeneities in the deposited quartz glass can be avoided if the $SiO_2$ particles are deposited at the time of their impact on the deposition surface at an opening angle of the burner flame between 3° and 15° and at a distance between the deposition burner and the deposition surface between 160 mm and 240 mm. This publication does not disclose any further information on how the deposition efficiency can be improved.

Overall, the prior art processes are still in need of improvement with regard to the deposition efficiency of the silicon-containing starting material, and there is therefore a need for a process for the production of synthetic quartz glass with which the deposition efficiency of the silicon-containing starting material can be improved. Improved deposition efficiency is accompanied by low manufacturing costs for the synthetic fused silica.

For these and other reasons there is a need for the present invention.

SUMMARY

One embodiment is a process for the production of synthetic quartz glass, including:
(1) evaporating a feedstock containing at least one organosilicon starting compound to form a feedstock vapor;
(2) feeding the feedstock vapor from process step (1) to a reaction zone in which the feedstock vapor is burned in a flame in the presence of oxygen and is converted to $SiO_2$ soot particles by oxidation and/or by hydrolysis;
(3) depositing the $SiO_2$ soot particles resulting from process step (2) on a deposition surface to form a soot body,
(4) if necessary, drying and vitrifying the soot body resulting from process step (3) to form synthetic fused silica.

The method according to one embodiment is characterized in that the synthesis flame used in the method has, in a targetless state, a ratio of the Full Width at Half Maximum ($FWHM_{vert}$) of the vertical luminous intensity to the Full Width at Half Maximum ($FWHM_{hori}$) of the horizontal luminous intensity of greater than 10.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 illustrates a burner geometry in accordance with one embodiment.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

In the context of one embodiment, the deposition efficiency is understood to be the quotient of the weight of $SiO_2$ deposited on the target tube to the total amount of $SiO_2$ produced mathematically (assuming complete conversion of all silicon from the precursor amount used).

According to one embodiment, this task is now solved by a process for the production of synthetic quartz glass, which is initially characterized by the following process steps:
(1) evaporating a feedstock containing at least one organosilicon starting compound to form a feedstock vapor;
(2) feeding the feedstock vapor from process step (1) to a reaction zone in which the feedstock vapor is burned in a flame in the presence of oxygen and is converted to $SiO_2$ soot particles by oxidation and/or by hydrolysis;
(3) depositing the $SiO_2$ soot particles resulting from process step (2) on a deposition surface to form a soot body,
(4) if necessary, drying and vitrifying the soot body resulting from process step (3) to form synthetic fused silica.

The method according to one embodiment is then characterized in that the synthesis flame used in the method has, in a targetless state, a ratio of the Full Width at Half Maximum ($FWHM_{vert}$) of the vertical luminous intensity to the Full Width at Half Maximum ($FWHM_{hori}$) of the horizontal luminous intensity of greater than 10.

To determine the half-widths of the luminous intensity in the vertical and horizontal directions, the following procedure is applied:

To determine the "vertical luminous intensity" of the flame (and its Full Width at Half Maximum value $FWHM_{vert}$) at a certain height above the burner, the luminous intensity of the flame (in $cd/mm^2$) is determined from a two-dimensional camera image by integrating horizontally over each horizontal pixel row of the camera. This horizontal intensity sum is calculated for every burner distance (each row) or height in the flame (results as unit cd/mm). This integrated horizontal luminous intensity of the flame is then obtained as a function of the vertical distance from the burner (this function is called "vertical luminous intensity"). A half-value width (in mm) of the vertical luminous intensity can be determined from the curve shape, which has a maximum at a certain burner distance.

To determine the "horizontal luminous intensity" of the flame (and its Full Width at Half Maximum value $FWHM_{hori}$) between two certain distances to the left and to the right of the center axis of the burner, the luminous intensity of the flame (in $cd/mm^2$) is determined from a two-dimensional camera image by integrating vertically over each vertical pixel column of the camera. This vertical intensity sum is determined for each horizontal distance to the left and to the right from the central burner axis (located at position "0") (results as unit cd/mm). The integrated vertical luminous intensity of the flame is then obtained as a function of the horizontal distance to the left and to the right of the burner center axis (This function is called "horizontal luminous intensity") and a half-value width (in mm) of the horizontal luminous intensity can be determined from the curve shape, which has a maximum close to the horizontal distance "0" (represented by the central burner axis). The FWHM value is then given by the horizontal distance between the two points to the left and to the right of the burner axis where the horizontal luminous intensity has dropped to half of its maximum value.

According to one embodiment, it was found that when a target (tube, rod or soot body) is introduced into a flame as defined above for the deposition of the $SiO_2$ particles, superior deposition efficiency is achieved.

Therefore, one embodiment relates to a synthesis flame that is operated targetless. By a targetless flame is meant a synthesis flame that is operated without a build-up tube, since otherwise the flame shape would depend on the thickness of the target tube (or soot body) and the distance of the burner from the target surface and the target temperature. In this case, the synthesis flame is generally essentially undisturbed.

The improved deposition efficiency according to one embodiment results, as already defined, from the quotient of the weight of the generated soot body and the calculated maximum amount of $SiO_2$ that can be generated, assuming complete conversion of the silicon from the silicon-containing starting compound used.

Each flame used in the generic processes emits an intrinsic radiation (chemiluminescence) caused by chemically formed short-lived intermediates, such as the radicals OH*, CH* or C2*, which is responsible for the glow of the flame in the ultraviolet and visible spectral ranges.

Since chemiluminescence occurs very locally and the luminous intensities in the UV and IR are difficult to determine, a camera calibrated to the derived SI unit candela using the procedure described in the experimental section below is used to determine the flame shape. Candela generally corresponds to the perception of the human eye and does not account for the UV and IR components, for which special cameras and windows would be required. Most of the intensity calibrated to candela therefore comes from the blackbody radiation of the $SiO_2$ and carbon soot particles produced in the flame.

The above-mentioned characteristic of the synthesis flame used in the method according to one embodiment is realized in a targetless state. Measurements to provide a flame in a targetless state as mentioned above are known to the person skilled in the art and can be achieved by, inter alia, the number of nozzles, the type of burner, the other gases as well as by gas quantities. In any case, the person skilled in the art can easily provide and verify a targetless flame in the sense of one embodiment.

In preferred embodiments of the method according to one embodiment, a flame shape of the burner is used in which (targetless) the ratio of the Full Width at Half Maximum (Full Width at Half Maximum, $FWHM_{vert}$) of the vertical luminous intensity to the Full Width at Half Maximum (Full Width at Half Maximum, $FWHM_{hori}$) of the horizontal luminous intensity is greater than 12, in one embodiment greater than 14, in one embodiment greater than 15, the luminous intensities being measured in $candela/mm^2$.

In the context of one embodiment, it is further preferred if the conversion of the feedstock vapor to be carried out in process step (2) is performed at an air number in the burner of less than or equal to 1.00.

In particular, preferred air numbers in the process according to one embodiment are less than or equal to 0.95, even more preferred less than or equal to 0.90, even more preferred less than or equal to 0.85, even more preferred less than or equal to 0.80, even more preferred less than or equal to 0.78, even more preferred less than or equal to 0.76.

The above air number is in one embodiment maintained during at least 20%, in one embodiment at least 30%, in one embodiment at least 40%, in one embodiment at least 50%, in one embodiment at least 60%, in one embodiment at least 70%, in one embodiment at least 80%, in one embodiment at least 90%, in one embodiment at least 95%, in one embodiment at least 97%, in one embodiment at least 98%, in one embodiment at least 99%, of the previously defined build-up time in the process according to one embodiment.

According to one embodiment, it was additionally found that the deposition efficiency of the $SiO_2$ particles can be significantly improved if the total amount of oxygen actively and centrally supplied to the burner during the reaction provided in process step (2) is stoichiometric or in one embodiment sub-stoichiometric, resulting in an air number less than or equal to 1.

According to one embodiment, it is thus provided that the gas flows in the burner of the apparatus according to one embodiment, i.e. the ratio of actively (i.e. under pressure) supplied oxygen from the burner (including feed oxygen) to all combustible materials actively (i.e. under pressure) supplied to the burner, are adjusted in such a way that an air number for all gases actively (i.e. under pressure) supplied to the burner is realized smaller than or equal to 1.

The air number $\lambda$ is defined as the ratio of the actual amount of oxygen available to the minimum amount of oxygen theoretically required for stoichiometrically complete combustion.

In the context of one embodiment, the total amount of oxygen used (at most) stoichiometrically for the conversion of the organosilicon starting compound in the burner is understood to be the amount of oxygen which is actively supplied to the burner under pressure. From this definition of the total amount of oxygen it follows that the amount of oxygen which is passively (i.e. unpressurized) supplied to the flame from the atmosphere is not added to the total amount of oxygen provided according to one embodiment. In particular, this excludes oxygen which is diffused into the flame from the atmosphere surrounding the burner during combustion of the organosilicon starting compound or is drawn in by negative pressure.

In addition, the amount of oxygen used (at most) stoichiometrically to convert the organosilicon starting compound (and any combustible auxiliary gases) in the burner is understood to be the total amount of oxygen supplied centrally to the burner.

The term "oxygen supplied to the burner" in a concentric burner means the amount of total oxygen actively leaving the burner in a surface region on the flame side of the burner, the surface region being formed by a substantially circular area having a radius r, where the radius r extends perpendicular to the direction of the bait-rod axis of rotation from the center of the stock nozzle or the center of the stock nozzle ensemble (nozzle(s) for feeding the silicon-containing starting compound), and the radius r corresponds to about ⅕ of the mean distance of the stock nozzle(s) from the deposition surface of the formed soot body.

The term oxygen supplied centrally to the burner is understood to mean, in the case of a linear burner, that quantity of total oxygen which, on the flame side of the burner, actively leaves the latter in a surface region, the surface region being formed by a surface, which has a distance d perpendicular to the direction of the bait-rod axis of rotation from the center of the material nozzle or the center line of the material nozzle ensemble (nozzle(s) for feeding the silicon-containing starting compound) and the distance d corresponds to about ⅕ of the mean distance of the material nozzle(s) from the deposition surface of the formed soot body.

The (at most) stoichiometric use of oxygen is in one embodiment maintained during the complete build-up time of the solids, whereby the build-up time is the time taken to feed the silicon-containing starting compound into the process according to one embodiment $$t_{Set\text{-}up\ time} = \Delta t_{Start\text{-}End\ Feeding\ silicon\text{-}containing\ starting\ compound}$$

In the context of one embodiment, the application of an air number of less than or equal to 1 during combustion results in the technical effects discussed below.

However, providing a targetless flame fulfilling an air number of less than or equal to 1 during the combustion is not a sufficient condition for a flame having, in a targetless state, a ratio of the Full Width at Half Maximum ($FWHM_{vert}$) of the vertical luminous intensity to the Full Width at Half Maximum ($FWHM_{hori}$) than of the horizontal luminous intensity of greater than 10. Not every flame operating with an air number of less than or equal to 1 possess automatically, in a targetless state, a ratio of the Full Width at Half Maximum ($FWHM_{vert}$) of the vertical luminous intensity to the Full Width at Half Maximum ($FWHM_{hori}$) of the horizontal luminous intensity of greater than 10.

That said, the use of a flame in a process according to nay prior art with an air number of equal or less than 1 does not possess mandatorily the claimed rate of the Full Width at Half Maximum ($FWHM_{vert}$) of the vertical luminous intensity to the Full Width at Half Maximum ($FWHM_{hori}$) of the horizontal luminous intensity of greater than 10.

The use of a rich combustion mixture (accompanied by an air number of less than 1) leads to a later, local ignition only of the peripheral areas of the flame, in which enough $O_2$ of the fuel feed has already diffused. The core area of the flame is more unwilling to ignite due to the too rich mixture. As a result, only a smaller volume of gas ignites at the same time and the oxygen must first diffuse in. This prevents the expansion of hot combustion gases from areas that have ignited into other flame areas and makes the flame less turbulent.

In the process according to one embodiment, the gas volume, which has an ignitable mixture, extends far upwards and has a lower lateral expansion. This results in a more laminar flame. The associated effect is that the narrower, more laminar flame attaches itself better to the soot body and forms a more stable stagnation point directly below the soot body. This leads to shorter diffusion paths for the $SiO_2$ particles to the deposition surface of the soot body and increases the residence time at the stagnation point, resulting in higher deposition efficiency overall.

The process according to one embodiment is in particular an Outside Vapor Deposition Method (OVD) process, Vapor Axial Deposition (VAD) process or a Soot-Boule process. Corresponding OVD and VAD processes are sufficiently known to those skilled in the art, and a Soot-Boule process is known, for example, from U.S. Pat. No. 8,230,701.

By setting the air number to the above values of less than 1, the flame shape according to one embodiment is additionally supported.

The individual process steps of the method according to one embodiment are described in more detail below:

Process Step (1)—Evaporation of the Feed Material

In process step (1), a feedstock containing at least one organosilicon starting compound is vaporized to form a feedstock vapor. The polymerizable silicon-containing starting compound is in one embodiment a polymerizable polyalkylsiloxane compound.

In principle, any polymerizable polyalkylsiloxane compound suitable for the production of synthetic silica glass can be used according to one embodiment. In the context of one embodiment, the term polyalkylsiloxane encompasses both linear (including branched structures) and cyclic molecular structures.

Particularly suitable cyclic representatives are polyalkylsiloxanes with the general empirical formula $$Si_pO_p(R)_{2p},$$

where p is an integer greater than or equal to 3. The radical "R" is an alkyl group, in the simplest case a methyl group.

Polyalkylsiloxanes are characterized by a particularly high silicon content per weight fraction, which contributes to the economy of their use in the production of synthetic fused silica.

The polyalkylsiloxane compound is in one embodiment selected from the group consisting of hexamethylcyclotrisiloxane (D3), octamethylcyclotetrasiloxane (D4), decamethylcyclopentasiloxane (D5), dodecamethylcyclohexasiloxane (D6), tetradecamethylcycloheptasiloxane (D7), hexadecamethylcyclooctasiloxane (D8) as well as their linear homologues and any mixtures of the above compounds. The notation D3, D4, D6, D7 and D8 is taken from a notation introduced by General Electric Inc. in which "D" represents the group [(CH$_3$)$_2$Si]—O—.

Within the scope of one embodiment, mixtures of the aforementioned polyalkylsiloxane compounds can also be used.

Because of its large-scale availability in high purity, octamethylcyclotetrasiloxane (OMCTS) is currently preferred. In the context of one embodiment, it is therefore particularly preferred if the polyalkylsiloxane compound is octamethylcyclotetrasiloxane (D4).

In principle, it is possible for the feedstock to be subjected to purification before being introduced into process step (1). Such purification processes are known to the skilled person. In a preferred embodiment, however, the feedstock is not subjected to an upstream purification process beforehand.

Evaporation of the feedstock can take place with or without the presence of a carrier gas component. In one embodiment, the feedstock is evaporated in the presence of a carrier gas, since this allows the evaporation to take place at temperatures below the boiling point of the organosilicon starting compound. An inert gas, for example nitrogen or argon, is typically used as the carrier gas. If a carrier gas is used, the molar ratio of the organosilicon starting compound to the carrier gas is in one embodiment in the range from 0.01 to 2; in one embodiment in the range from 0.02 to 1.5, and in one embodiment in the range from 0.05 to 1.25. In particular, it is preferred that nitrogen with a moisture content <40 ppm by volume is used as the carrier gas and OMCTS is used as the organosilicon starting compound. It is further preferred that the molecular ratio of OMCTS to nitrogen is in the range of 0.015 to 1.5.

The evaporation step is known to the skilled person. Depending on the selected molecular ratio of the organosilicon starting compound and the carrier gas, the organosilicon starting compound is converted into a vapor phase, in one embodiment at temperatures between 120 and 200° C. The vaporization temperature in the evaporation chamber should always be at least a few degrees above the dew point of the organosilicon starting compound. The evaporation temperature in the evaporation chamber should always be at least a few degrees above the dew point of the organosilicon starting compound. The dew point is in turn dependent on the selected molecular ratio of organosilicon starting compound and carrier gas. In a preferred embodiment, this is achieved by preheating the organosilicon starting compound to temperatures between 40 and 120° C. prior to evaporation and then spraying it into an evaporation chamber that has a higher temperature than the preheating of the feedstock. In a preferred embodiment, the inert carrier gas can additionally be preheated to temperatures of up to 250° C. before being fed to the evaporation chamber. It is advantageous that the temperature in the evaporation chamber is always on average above the dew point temperature of the mixture of organosilicon starting compound and carrier gas. Suitable evaporation processes are described, for example, in international patent applications WO 2013/087751 A and WO 2014/187513 A and German Patent Application DE 10 2013 209 673.

In the context of one embodiment, the term "dew point" describes the temperature at which a state of equilibrium is reached between condensing and evaporating liquid.

In the context of one embodiment, "vaporization" is understood to be the process by which the feedstock is essentially converted from the liquid phase to a gaseous phase. This is in one embodiment done by using temperatures, as described above, which are above the dew point of the organosilicon starting compound as the main component of the feedstock. The skilled person is aware that, from a process engineering point of view, it cannot be ruled out that small liquid droplets of the feedstock may be entrained. Thus, in process step (1), a feedstock vapor is in one embodiment generated which in one embodiment contains not less than 97 mol %, in one embodiment not less than 98 mol %, in one embodiment not less than 99 mol %, in one embodiment not less than 99.9 mol % of gaseous components.

The vaporous organosilicon starting compound or a mixture of carrier gas and vaporous organosilicon starting compound is usually taken from the evaporation chamber and fed into a burner. Before being fed into the burner, the vaporous material or the mixture of vaporous material and carrier gas is in one embodiment mixed with oxygen. In the flame, the organosilicon starting compound is oxidized to SiO$_2$. Fine-particle, amorphous SiO$_2$ (SiO$_2$ soot) is formed, which is deposited in the form of a porous mass first on the surface of a carrier and later on the surface of the forming soot body.

Process Step (2)—Feeding the Feedstock Vapor to a Reaction Zone in which the Feedstock Vapor is Burned in a Flame in the Presence of Oxygen and is Converted to SiO$_2$ Soot Particles by Oxidation and/or by Hydrolysis In process step (2), the gaseous feedstock vapor resulting from process step (1) is fed to a reaction zone in which the feedstock vapor is converted to SiO$_2$ particles by oxidation and/or by hydrolysis.

This process step corresponds in particular to the known soot process or the known direct glazing process. The possible designs of these two processes are known to the person skilled in the art.

For the combustion of the feedstock vapor, a concentric burner is usually used, which has gas outlet nozzles arranged in a circle around the center of the burner mouth.

In the context of one embodiment, a method is preferred in which a first, silicon-containing starting component is fed to the deposition burner in a central region, an oxygen stream is fed to the burner in an outer region, and a separation gas stream (hydrogen) is fed between the central region and the outer region.

The central nozzle is usually used to feed the feedstock vapor, which in the context of one embodiment is usually used premixed with a carrier gas. In addition, oxygen is in one embodiment added to the feedstock vapor, so that a feed stream results from the center nozzle of the concentric burner usually used, which contains the carrier gas and oxygen in addition to the feedstock vapor.

The central nozzle of the burner is usually surrounded by a second nozzle concentrically arranged around the central nozzle, from which a separation gas is introduced into the burner. This separation gas separates the $SiO_2$ starting compound from the further oxygen stream entering the burner from another concentric nozzle arranged concentrically around the center nozzle and the separation gas nozzle.

According to one embodiment, it is intended to operate the burner in such a way that, with a targetless and generally substantially undisturbed flame, the ratio of the Full Width at Half Maximum ($FWHM_{vert}$) of the vertical luminous intensity to the Full Width at Half Maximum ($FWHM_{hori}$) of the horizontal luminous intensity is greater than 10, the luminous intensities being measured in candela/mm². The half-value widths of the horizontal and vertical luminous intensities are first determined at identical gas flow values with a targetless flame.

The $SiO_2$ soot particles produced by using the deposition torch are usually deposited on a carrier tube rotating about its longitudinal axis, so that the soot body is built up layer by layer. For this purpose, the deposition torch can be moved back and forth along the longitudinal axis of the carrier tube between two turning points. In addition, the use of a burner block in which several deposition burners with one flame each are located is preferred. In the case of the use of a burner block, at least one flame is operated with the characteristic according to one embodiment (ratio of the Full Width at Half Maximum ($FWHM_{vert}$) of the vertical luminous intensity to the Full Width at Half Maximum ($FWHM_{hori}$) of the horizontal luminous intensity). In a further preferred embodiment, all flames of the burner block have the characteristic according to one embodiment.

In the context of one embodiment, it was further found that it is favorable for the yield efficiency if the air ratio, i.e. the ratio of oxygen to feedstock, is less than or equal to 1. According to one embodiment, it is therefore further preferred that oxygen is used in the process step (2) sub-stoichiometrically in proportion to the feedstock vapor to be hydrolyzed and/or polymerized and other fuel gases (for example, $H_2$ or $CH_4$ from other nozzles).

Further preferred are air numbers less than or equal to 0.95, even further preferred less than or equal to 0.90, even further preferred less than or equal to 0.85, even further preferred less than or equal to 0.80, even further preferred less than or equal to 0.78, even further preferred less than or equal to 0.76.

By setting the air number to the aforementioned preferred ranges, together with the adjustment of the ratio of the Full Width at Half Maximum ($FWHM_{vert}$) of the vertical luminous intensity to the Full Width at Half Maximum ($FWHM_{hori}$) of the horizontal luminous intensity according to one embodiment, it is possible to further improve the deposition efficiency, since the characteristics of the flame used according to one embodiment are also influenced by setting an air number to a value less than or equal to 1, resulting in improved deposition efficiency.

The use of a richer combustion mixture (accompanied by an air number of less than 1) leads to a later, local ignition of only the peripheral areas of the flame. At first, only the outer edge areas of the feed nozzle stream, into which enough $O_2$ has already diffused from the oxidizer nozzle, ignite. The core area of the flame is more unwilling to ignite due to the excessively rich mixture. As a result, only a smaller volume of gas ignites at the same time and the oxygen must first diffuse in. The expansion of the hot combustion gases from areas that have ignited makes the flame more turbulent. The effect is self-reinforcing, as the increased turbulence promotes mixing with oxygen. The gas volume that has ignitable mixing stretches further upward in the process of one embodiment and has less lateral expansion. This results in a much more laminar flame. The associated effect is that the narrower, more laminar flame attaches itself better to the soot body and forms a more stable stagnation point. This leads to shorter diffusion paths for the $SiO_2$ particles to the deposition surface of the soot body and increases the residence time at the stagnation point, which overall results in higher deposition efficiency.

The lowered ignition capability in the richer gas configuration causes a reduction in the average diameter of the gas regions that ignite simultaneously (smaller "flamelets"). The large increase in volume due to thermal expansion and mole gain (for example, 1 mole of OMCTS gas produces x times the number of moles of combustion gases) due to decomposition creates pressure waves that make the flame much more turbulent. Thus, the more elongated region of combustion with the richer gas arrangement results in a more laminar flame with a longer burnout length with the advantages described earlier. It must be taken into account that in the burner and flame center in the process according to one embodiment, only feed stream (oxygen-containing) and hydrogen are present, which together are too rich to ignite quickly, and that the oxygen $O_2$ from the outer nozzle reaches the center later, distributed over a longer distance, because of lower turbulence.

Since in the context of one embodiment the feedstock is in one embodiment delivered to the combustion zone together with a carrier gas and oxygen from the central nozzle of the, in one embodiment, concentric burner, it must be taken into account that the amount of oxygen used to calculate the air number results from the admixture of oxygen in the stream of feedstock and the additional oxygen used in the outer nozzle (combustion gas or oxidizing gas) of the concentric burner.

Process Step (3)—Deposition of the $SiO_2$ Particles

In process step (3), the $SiO_2$ particles resulting from process step (2) are deposited on a deposition surface. The design of this process step is within the knowledge of the skilled person in the art.

For this purpose, the $SiO_2$ particles formed in process step (2) are deposited layer by layer on a rotating carrier to form a porous soot body.

During the deposition of the soot particles, the distance between the torch and the support material is changed, if necessary, in order to fulfill the condition described earlier.

Process Step (4)—Drying and Vitrification, if Necessary

In process step (4), the $SiO_2$ particles resulting from process step (3) are dried and vitrified, if necessary, to form synthetic quartz glass. This process step is particularly necessary if the previously performed process steps were carried out according to a soot process. The design of this process step is within the knowledge of the person skilled in the art.

The process according to one embodiment is particularly suitable for the production of quartz glass by the "soot process", in which the temperature during deposition of the $SiO_2$ particles in process step (3) is so low that a porous $SiO_2$ soot layer is obtained, which is dried and vitrified in the separate process step (4) to form synthetic quartz glass.

The process according to one embodiment is suitable for the production of synthetic fused silica, which is carried out as an external or internal deposition process. If the process according to one embodiment is carried out as an external deposition process, it is in one embodiment an OVD process (outside vapor phase deposition), VAD process (vapour phase axial deposition) or Soot-Boule process.

The process according to one embodiment can reduce the manufacturing costs for quartz glass.

It is a further object of one embodiment to provide an apparatus for producing synthetic fused silica, the apparatus including:
(a) at least one evaporator zone for evaporating at least one feedstock containing at least one organosilicon starting compound to form a feedstock vapor;
(b) at least one reaction zone into which the feedstock vapor is fed from the evaporator zone (a) and in which the feedstock is converted to $SiO_2$ particles by pyrolysis or by hydrolysis, the reaction zone including a burner; and
(c) at least one deposition zone including a deposition zone for the $SiO_2$ particles resulting from the reaction zone (c) to form synthetic fused silica, wherein the deposition zone comprises a soot body.

The device according to one embodiment is designed so that the burner used produces a flame which, in a targetless state, has a ratio of the Full Width at Half Maximum ($FWHM_{vert}$) of the vertical luminous intensity to the Full Width at Half Maximum ($FWHM_{hori}$) of the horizontal luminous intensity greater than 10.

For the definition of vertical and horizontal luminous intensity, it is referred to the above.

In accordance with the above discussion of the process according to one embodiment, the flame of the burner is in one embodiment adjusted so that in a targetless condition a ratio of the Full Width at Half Maximum ($FWHM_{vert}$) of the vertical luminous intensity to the Full Width at Half Maximum ($FWHM_{hori}$) of the horizontal luminous intensity is greater than 12, in one embodiment greater than 14, in one embodiment greater than 15.

Further relevant features can be found in the above process description.

Finally, one embodiment relates to the use of this apparatus for the production of synthetic fused silica.

EXAMPLE

Liquid feedstock OMCTS together with nitrogen as carrier gas, which has been preheated to 180° C., is vaporized at 170° C. in a vaporizer according to one embodiment of International patent application PCT/EP2012/075346. The nitrogen-OMCTS vapor mixture is introduced into a concentric burner together with oxygen ($O_2$ mix), the burner being operated under the following conditions:

| | | Supply nozzle | | | $H_2$ Nozzle | $O_2$ Nozzle |
|---|---|---|---|---|---|---|
| Example | Air number | OMCTS [kg/h] | $O_2$ Mix [slm] | $N_2$ Carrier [slm] | $H_2$ Separation [slm] | $O_2$ Burn [slm] |
| 1 | 0.78 | constant | variable | constant | constant | variable |
| 2 | 1 | constant | variable | constant | constant | variable |
| 3 | 1.23 | constant | variable | constant | constant | variable |

The amount of oxygen in mix stream and in the O2 nozzle is varied to achieve the desired air number:

Results:

| | Soot body | | | | Half-widths | | |
|---|---|---|---|---|---|---|---|
| Example | Weight [g] | Diameter [mm] | Density [%] | Efficiency [%] | $FWHM_{vert}$ [mm] | Peak Position [mm] | Peak height |
| 1 | 8319 | 280 | 18.4 | 72.81 | 134.6 | 102.0 | 4470811.9 |
| 2 | 7620 | 226 | 27.3 | 66.69 | 222.4 | 61.9 | 1642016.9 |
| 3 | 6173 | 192 | 34.4 | 54.03 | 216.5 | 102.0 | 1872177.6 |

| | Soot body | | | | Half-widths | | |
|---|---|---|---|---|---|---|---|
| Example | Weight [g] | Diameter [mm] | Density [%] | Efficiency [%] | $FWHM_{hori}$ [mm] | Peak Position [mm] | Peak height |
| 1 | 8319 | 280 | 18.4 | 72.81 | 9.5 | 1.7 | 50884671.7 |
| 2 | 7620 | 226 | 27.3 | 66.69 | 26.2 | −2.8 | 10824741.9 |
| 3 | 6173 | 192 | 34.4 | 54.03 | 25.2 | −5.0 | 12583379.8 |

| Example | Ratio $FWHM_{vert}$/$FWHM_{hori}$ | Comment |
|---|---|---|
| 1 | 14.2 | According to one embodiment |
| 2 | 8.5 | Not according to the embodiment |
| 3 | 8.6 | Not according to the embodiment |

The burner geometry used in these examples is shown in FIG. 1, in which means:
1: the inner nozzle;
2: the middle nozzle; and
3: the outer nozzle.

The process according to one embodiment (example 1) leads to an improved deposition efficiency than the comparative examples (examples 2 and 3).

The calibration of the light intensity of $SiO_2$ synthesis flames was performed in the above experiment as follows:

Calibration of the flame luminous intensity was performed by comparison with a calibrated light source (LOT-Oriel K-150WH with Gossen-Metrawatt constant SLP120-80/snTD4541060001; first calibration by opto.cal SCS 053, certificate number 09333 on Apr. 11, 2009; second calibration by opto.cal SCS 053, certificate number 16428 on Sep. 12, 2016).

In order to calibrate the sensitivity of the camera, the calibration light source was mounted at the typical distance at which the measurements are performed. For the current setup, the working distance is 450 mm. Due to the perfect Lambertian emission characteristics, the luminous intensity behaves in a 1/r2 manner, so in the experiments the luminous flux can be calculated with the distance used for calibration by opto.cal for the working distance.

In the calibration protocol, the illuminance is the target calibration parameter. For this calibration, the luminance is more suitable due to the reference to the emission area. Therefore, the unit of illuminance [Ev]=lm/m$^2$=lx was converted to the unit of luminance [Lv]=cd/m$^2$ or Cd/mm$^2$.

For Lambert's radiators, this conversion requires the additional knowledge of the distances during calibration and measurement. This specific light source has an illuminance of Ev=293.5 lx at a distance of 250 mm, while the illuminance is Iv=90.59 Cd at a distance of 450 mm; the working distance for the experiments. The application of light intensity is a detector-based unit, i.e., it is based on the detector area and integrates the total light emission. To enable an emitter-based measurement, the effective emitter area is included so that the resulting unit is the luminance.

The application of photometric units (lux/lumen/candela) uses the CIE luminance function to mimic the spectral sensitivity of the human eye. The calibration light source and flame emissions have different spectral characteristics. Therefore, the CIE luminance function is used to weight the wavelength-dependent emissions and to obtain photometric units.

The camera used is a Basler acA1300-200 um with Basler C125-0818-5M-P f8mm. The camera was set once to provide technically useful measurement signals, and then the focal length, aperture, and position of the camera to the flame were fixed and kept constant throughout the measurements.

The spectrally resolved emission spectrum of the calibration light source is reported in the calibration protocol with a wavelength resolution of 2 nm from 280 nm to 800 nm, which is large enough to cover the entire CIE luminosity function. The emissions from the flame were spectrally resolved for different conditions.

With these prerequisites, it is possible to measure the light intensity of the flame against a calibrated light source traceable to the Swiss Metrology Institute.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A process for producing synthetic quartz glass, comprising:
   (1) evaporating a feedstock containing at least one organosilicon starting compound to form a feedstock vapor;
   (2) feeding the feedstock vapor from (1) to a reaction zone in which the feedstock vapor is burned in a flame in the presence of oxygen and is converted to $SiO_2$ soot particles by oxidation or by hydrolysis;
   (3) depositing the $SiO_2$ soot particles resulting from (2) on a deposition surface to form a soot body; and
   (4) if necessary, drying and vitrifying the soot body resulting from (3) to form synthetic fused silica;
   characterized in that the synthesis flame used in the process has a ratio of the Full Width at Half Maximum ($FWHM_{vert}$) of the vertical luminous intensity to the Full Width at Half Maximum ($FWHM_{hori}$) of the horizontal luminous intensity greater than 10 in a targetless state.

2. The process according to claim 1, characterized in that the flame used in the process has a ratio of the Full Width at Half Maximum ($FWHM_{vert}$) of the vertical luminous intensity to the Full Width at Half Maximum ($FWHM_{hori}$) of the horizontal luminous intensity of greater than 12 in a targetless state.

3. The process according to claim 1, characterized in that the flame used in the process has a ratio of the Full Width at Half Maximum ($FWHM_{vert}$) of the vertical luminous intensity to the Full Width at Half Maximum ($FWHM_{hori}$) of the horizontal luminous intensity of greater than 14 in a targetless state.

4. The process according to claim 1, characterized in that the flame used in the process has a ratio of the Full Width at Half Maximum ($FWHM_{vert}$) of the vertical luminous intensity to the Full Width at Half Maximum ($FWHM_{hori}$) of the horizontal luminous intensity of greater than 15 in a targetless state.

5. The process according to claim 1, characterized in that (2) is carried out using a burner having a concentric cross-section, wherein inside the concentric cross-section the oxygen is introduced as a feed-mix together with the feedstock vapor into the burner flame as well as an oxygen-containing oxidizing gas, wherein the feed-mix is separated from the oxygen-containing oxidizing gas by a separation gas.

6. The process according to claim 1, characterized in that the organosilicon starting compound is selected from the group consisting of hexamethylcyclotrisiloxane (D3), octamethylcyclotetrasiloxane (D4), decamethylcyclopentasiloxane (D5), decamethylcyclohexasiloxane (D6), tetradecamethylcycloheptasiloxane (D7), hexadecamethylcyclooctasiloxane (D8), their linear homologues and any mixtures of the above compounds.

7. The process according to claim 6, characterized in that the polyalkylsiloxane compound is octamethylcyclotetrasiloxane (D4).

* * * * *